(12) United States Patent
Hicks

(10) Patent No.: US 9,214,807 B2
(45) Date of Patent: Dec. 15, 2015

(54) SYSTEMS AND METHODS FOR DELIVERING POWER IN RESPONSE TO A CONNECTION EVENT

(71) Applicant: FREESCALE SEMICONDUCTOR, INC., Austin, TX (US)

(72) Inventor: Dennis Hicks, Los Angeles, CA (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 620 days.

(21) Appl. No.: 13/689,037

(22) Filed: Nov. 29, 2012

(65) Prior Publication Data

US 2013/0082533 A1  Apr. 4, 2013

Related U.S. Application Data

(63) Continuation of application No. 12/592,289, filed on Nov. 20, 2009, now abandoned.

(51) Int. Cl.
*H01H 47/00* (2006.01)
*H02J 1/00* (2006.01)
*H02J 1/10* (2006.01)

(52) U.S. Cl.
CPC . *H02J 1/00* (2013.01); *H02J 1/108* (2013.01); *H02J 2001/004* (2013.01); *Y10T 307/696* (2015.04)

(58) Field of Classification Search
CPC ....... H02J 1/108; H02J 1/00; H02J 2001/004; Y10T 307/696
USPC .......................................................... 307/126
See application file for complete search history.

(56) References Cited

U.S. PATENT DOCUMENTS

| 4,382,221 | A | 5/1983 | Reynolds |
| 5,568,370 | A | 10/1996 | Goldstein et al. |
| 5,602,455 | A | 2/1997 | Stephens et al. |
| 5,771,159 | A | 6/1998 | Sako et al. |
| 5,831,415 | A | 11/1998 | Rudolph |
| 5,847,543 | A | 12/1998 | Carroll |

(Continued)

FOREIGN PATENT DOCUMENTS

| CN | 1123968 A | 6/1996 |
| CN | 2560039 Y | 7/2003 |

(Continued)

OTHER PUBLICATIONS

Office Action mailed Feb. 15, 2012 in U.S. Appl. No. 12/592,289.

(Continued)

*Primary Examiner* — Jared Fureman
*Assistant Examiner* — Duc M Pham

(57) ABSTRACT

Systems and methods are provided for delivering power from a first energy source to a second energy source. An electrical system for delivering power from a first energy source to a second energy source comprises an interface configured to be coupled to the second energy source, a switching element coupled between the first energy source and the interface, and a processing system coupled to the switching element and the interface. The processing system is configured to identify a connection event based on an electrical characteristic of the interface that is indicative of the interface being coupled to the second energy source and operate the switching element to provide a path for current from the first energy source in response to identifying the connection event.

20 Claims, 3 Drawing Sheets

(56) References Cited

U.S. PATENT DOCUMENTS

| | | | |
|---|---|---|---|
| 5,847,545 A * | 12/1998 | Chen | H01R 29/00 307/18 |
| 6,376,939 B1 | 4/2002 | Suzuki et al. | |
| 6,612,875 B1 | 9/2003 | Liao | |
| 6,683,439 B2 | 1/2004 | Takano et al. | |
| 6,696,647 B2 | 2/2004 | Ono et al. | |
| D490,058 S | 5/2004 | Mkhitarian | |
| 6,956,353 B1 | 10/2005 | Klitzner | |
| 7,035,126 B1 | 4/2006 | Lanni | |
| 7,151,356 B1 | 12/2006 | Chen | |
| 7,154,356 B2 | 12/2006 | Brunette et al. | |
| 7,224,086 B2 | 5/2007 | Germagian et al. | |
| 7,287,705 B2 | 10/2007 | Tang | |
| 7,530,823 B1 | 5/2009 | Thornton et al. | |
| 7,573,151 B2 | 8/2009 | Acena et al. | |
| 7,784,610 B2 | 8/2010 | Mason | |
| 7,910,833 B2 | 3/2011 | McGinley et al. | |
| 7,960,648 B2 | 6/2011 | McGinley et al. | |
| 2004/0085043 A1 | 5/2004 | Germagian | |
| 2004/0204170 A1 | 10/2004 | Mkhitarian | |
| 2004/0204177 A1 | 10/2004 | Pon | |
| 2005/0057218 A1 | 3/2005 | Chen | |
| 2005/0168189 A1 * | 8/2005 | Schweigert | H02J 9/005 320/107 |
| 2005/0194935 A1 | 9/2005 | Kubota et al. | |
| 2006/0267549 A1 | 11/2006 | Kung | |
| 2007/0126290 A1 | 6/2007 | Jaynes et al. | |
| 2007/0222414 A1 | 9/2007 | Chen | |
| 2008/0157712 A1 | 7/2008 | Garcia | |
| 2008/0211310 A1 | 9/2008 | Jitaru et al. | |
| 2011/0095728 A1 | 4/2011 | Chen et al. | |
| 2011/0121656 A1 * | 5/2011 | Hicks | H02J 1/108 307/80 |

FOREIGN PATENT DOCUMENTS

| | | |
|---|---|---|
| CN | 1751425 A | 3/2006 |
| JP | 05-30683 | 2/1993 |
| JP | 05095414 | 4/1993 |
| JP | 2003169419 A | 6/2003 |
| JP | 2004282950 A | 10/2004 |
| WO | 2008/019270 | 2/2008 |

OTHER PUBLICATIONS

Office Action mailed May 10, 2012 in U.S. Appl. No. 12/607,946.

* cited by examiner

SYSTEMS AND METHODS FOR DELIVERING POWER IN RESPONSE TO A CONNECTION EVENT

CONTINUING INFORMATION

This patent application is a continuation of a U.S. patent application having a filing date of Nov. 20, 2009, having a Ser. No. of 12/592,289, and having common assignee, all of which is incorporated by reference in its entirety.

TECHNICAL FIELD

Embodiments of the subject matter described herein relate generally to electrical systems, and more particularly, embodiments of the subject matter relate to electrical systems that efficiently utilize power from an energy source, such as an electrical grid, when charging or otherwise delivering power to an electronic device.

BACKGROUND

Many electronic devices operate with direct current (DC). However, most electrical transmission and/or distribution systems provide alternating current (AC). Accordingly, many electronic devices utilize an AC-to-DC power adapter, variously referred to as an AC adapter, wall adapter, wall wart, or charger, to convert AC power from an AC supply (e.g., the mains electrical supply) to DC power that may be used to operate and/or charge the electronic device. Many power adapters consume standby power, that is, they consume power even though the electronic device may be disconnected, fully charged or turned off. Users routinely leave power adapters plugged in or otherwise connected to the AC supply. As a result, the widespread use of power adapters consumes a significant amount of standby power, which, in turn, provides little or no utility and effectively wastes electrical energy.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
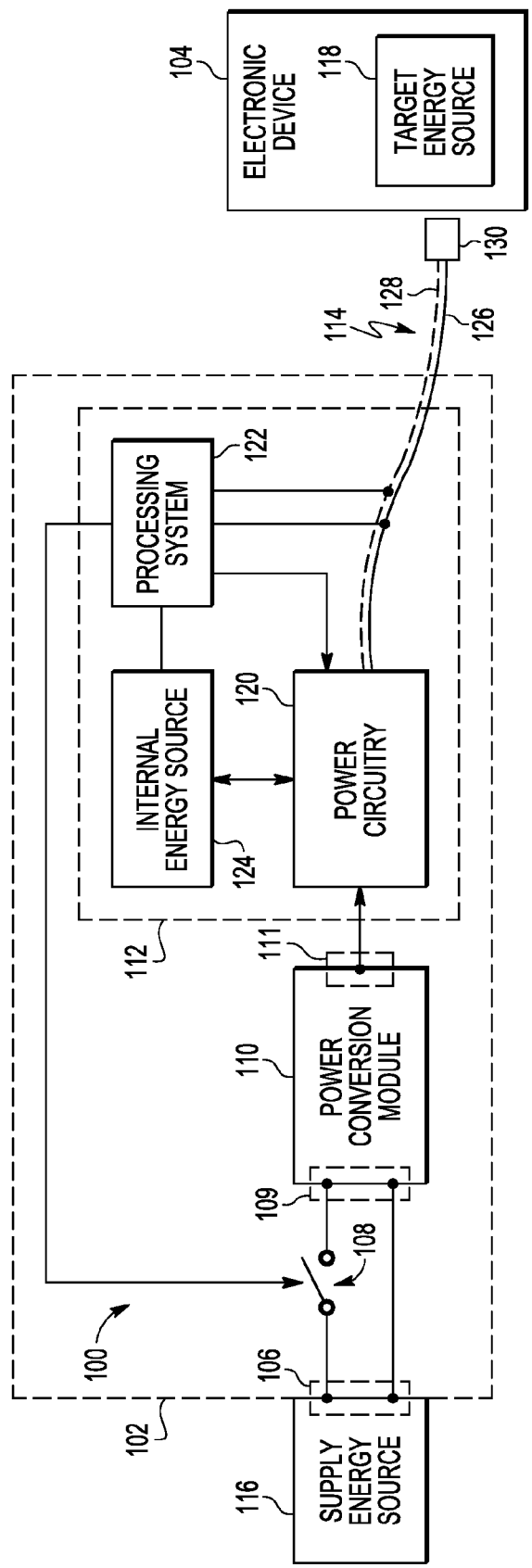
FIG. 1 is a block diagram of an electrical system suitable for use in a power adapter in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

The following description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

For the sake of brevity, conventional techniques related to power conversion, battery charging systems and/or schemes, capacitance sensing, voltage sensing, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the following description for the purpose of reference only, and thus are not intended to be limiting, and the terms "first," "second" and other such numerical terms referring to structures do not imply a sequence or order unless clearly indicated by the context.

Technologies and concepts discussed herein relate to systems and/or methods for efficiently delivering electrical power to an electronic device and/or a target energy source. A switching element, such as a latching relay, is utilized to establish a path for current from a supply energy source automatically in response to an interface being coupled to the electronic device and/or target energy source. In an exemplary embodiment, the interface is realized as a shielded cable, wherein the switching element is operated to provide a path for electrical current from the supply energy source in response to detecting or otherwise identifying a condition or characteristic of the shield that is indicative of the shielded cable being plugged-in to the electronic device and/or target energy source. The switching element is operated to prevent current from the supply energy source when power is no longer required by the electronic device and/or target energy source, for example, when the target energy source is fully-charged (or charged above a state of charge threshold) or the interface is decoupled from the electronic device and/or target energy source. As a result, a power from the supply energy source is not wasted when the interface is not coupled to the electronic device and/or target energy source or when the electronic device and/or target energy source does not require power from the supply energy source.

FIG. 1 depicts an exemplary embodiment of an electrical system 100 suitable for use with a power adapter 102 for an electronic device 104, such as a mobile device (e.g., a cellular phone, a personal digital assistant, or the like), a computer (e.g., a laptop computer, a personal computer, a netbook computer, or the like), a digital audio player, an e-book reader, or another suitable electronic device. In an exemplary embodiment, the electrical system 100 includes, without limitation, a first interface 106, a switching element 108, a power conversion module 110, a power management system 112 and a second interface 114. It should be understood that FIG. 1 is a simplified representation of an electrical system 100 for purposes of representation and ease of explanation and is not intended to limit the subject matter described herein in any way. It will be appreciated that practical embodiments of the electrical system 100 may include additional components and/or elements configured to perform additional functionality not described herein.

In an exemplary embodiment, the switching element 108 is configured electrically in series between the first interface 106 and the power conversion module 110, such that the switching element 108 prevents or allows current (or power) flow to the power conversion module 110 from a supply energy source 116 coupled to the first interface 106. As described in greater detail below, in an exemplary embodiment, the power management system 112 is configured to automatically operate (e.g., close or turn ON) the switching element 108 in response to the second interface 114 being coupled to the electronic device 104 to provide a path for current from the supply energy source 116 and/or first interface 106, thereby allowing power from the supply energy source 116 to be delivered to the electronic device 104 and/or target energy source 118 via the second interface 114. For convenience, but without limitation, the first interface 106 may alternatively be referred to herein as the supply interface and the second interface 114 may alternatively be referred to herein as the device interface.

In accordance with one or more embodiments, the supply energy source 116 is realized as an alternating current (AC) power supply such as a single-phase AC power supply common to most buildings, residences, or other structures within an electric power grid (e.g., the mains electricity or grid power). Accordingly, for convenience, but without limitation, the supply energy source 116 may alternatively be referred to herein as an AC energy source and the first interface 106 may alternatively be referred to herein as an AC interface. However, it should be appreciated that although the subject matter may be described herein in the context of an AC power supply, in other embodiments, the supply energy source 116 may be realized as a direct current (DC) power supply, such as, for example, a solar cell, a fuel cell, a battery, or another suitable DC power supply. It will be appreciated that the voltage and/or frequency of the AC energy source 116 may vary depending on the geographic region where the electrical system 100 and/or power adapter 102 is being utilized. For example, in the United States, the AC energy source 116 may be realized as 120 Volt or 240 Volt at 60 Hz, while in other regions the AC energy source 116 may be realized as 110 Volts or 220 Volts at 50 Hz.

In an exemplary embodiment, the AC interface 106 includes a plug or another suitable physical feature adapted to interface, mate, or otherwise establish an electrical connection with a corresponding physical feature of the AC energy source 116 (e.g., a wall socket or electrical outlet) to provide an electrical interface between the electrical system 100 and the AC energy source 116. In accordance with one or more embodiments, the power adapter 102 is realized as a plug-in or wall-mounted power adapter (or wall wart), wherein the switching element 108, power conversion module 110 and power management system 112 are disposed proximate to and/or integrated with the AC interface 106. In alternative embodiments, the power adapter 102 may be realized with a docking station or docking platform, wherein the switching element 108, power conversion module 110 and power management system 112 are integrated with the device interface 114 and disposed distal from the AC interface 106, as will be appreciated in the art.

In an exemplary embodiment, the switching element 108 is coupled between the AC interface 106 and an input 109 of the power conversion module 110 and configured electrically in series between the AC interface 106 and the power conversion module 110, such that the switching element 108 may be utilized to regulate or otherwise control the flow of electrical current (or power) from the AC energy source 116 to the input 109 of the power conversion module 110, as described in greater detail below. In an exemplary embodiment, the output 111 of the power conversion module 110 is coupled to device interface 114 via the power management system 112. The power management system 112 regulates the delivery and/or flow of power from the output 111 of the power conversion module 110 to the electronic device 104 and/or target energy source 118 as described in greater detail below.

In an exemplary embodiment, the switching element 108 is realized as a latching relay configured to change its state in response to an electrical signal from the power management system 112. In alternative embodiments, the switching element 108 may be realized as a non-latching relay, a solid state switch, a contactor, or another suitable switching arrangement. In an exemplary embodiment, in a first state (e.g., a closed state or ON state), the switching element 108 provides or otherwise establishes a path for current (or power flow) from the AC interface 106 and/or AC energy source 116 to the power conversion module 110. In a second state (e.g., the open state or OFF state), the switching element 108 prevents or otherwise inhibits flow of current from the AC interface 106 and/or AC energy source 116 to the power conversion module 110. In this regard, the electrical system 100 and/or power adapter 102 consumes substantially zero current or power from the AC energy source 116 when the switching element 108 is in an open state. As described in greater detail below, in an exemplary embodiment, the switching element 108 is operated such that the power adapter 102 consumes current (or power) from the AC energy source 116 when desired and/or required by the electronic device 104 and/or target energy source 118 coupled to the device interface 114 and does not consume current (or power) at other times. Thus, the power adapter 102 is a "zero draw" device, or in other words, the power adapter 102 consumes substantially zero standby power.

In an exemplary embodiment, the power conversion module 110 is configured to convert the voltage and/or current from the AC energy source 116 at its input 109 to a voltage level and/or current level at its output 111 that is suitable for the target energy source 118. In an exemplary embodiment, the target energy source 118 is realized as a direct current (DC) energy storage element, wherein the power conversion module 110 converts AC power from AC energy source 116 to a DC voltage level suitable for the target energy source 118. In an exemplary embodiment, the target energy source 118 is realized as a rechargeable battery (or rechargeable battery pack), such as a lithium-ion battery, a nickel metal hydride battery, a nickel-cadmium battery, a lead acid battery, or the like. In alternative embodiments, the target energy source 118 may be realized as a capacitor (e.g., an ultracapacitor or super capacitor) or another suitable energy storage element. In an exemplary embodiment, the power conversion module 110 comprises a transformer (or transformer stage) coupled to the input 109 followed by a rectifier (or rectification stage) between the transformer and the output 111, wherein in response to AC power (or current) at the input 109, the transformer and rectifier are cooperatively configured to produce a DC voltage level at the output 111 of the power conversion module 110 that is suitable for the target energy source 118. For example, in an exemplary embodiment, the power conversion module 110 produces a DC voltage at the output 111 that is substantially equal to (e.g., within practical and/or realistic operating tolerances) the nominal voltage of the target energy source 118 when the target energy source 118 is fully charged. It should be noted that in alternative embodiments, if the supply energy source 116 is realized as a DC energy source, the power conversion module 110 is realized as a suitably configured DC-to-DC converter, as will be appreciated in the art.

The power management system 112 generally represents the combination of hardware, firmware, processing logic and/or software configured to regulate the delivery and/or flow of power from the output 111 of the power conversion module 110 and/or AC energy source 116 to the target energy source 118. In exemplary embodiment, the power management system 112 comprises power circuitry 120, a processing system 122, and an internal energy source 124. The power circuitry 120 is coupled between the output 111 of the power conversion module 110 and the device interface 114. In an exemplary embodiment, the power circuitry 120 comprises an H-bridge and/or other circuitry suitably configured to allow the processing system 122 to regulate, monitor, or otherwise control the power flow from the output 111 of the power conversion module 110 to the electronic device 104 and/or target energy source 118. The power circuitry 120 is also coupled to the internal energy source 124 and includes circuitry configured to allow bi-directional current flow (or power flow) to/from the internal energy source 124 or otherwise allow the processing system 122 to control the power flow from the output of the power conversion module 110. It should be noted that in some alternative embodiments, the output 111 of the power conversion module 110 may be coupled directly to the connection arrangement 126.

In an exemplary embodiment, the processing system 122 is coupled to the power circuitry 120, the internal energy source 124, and the device interface 114. The processing system 122 generally represents the combination of hardware, firmware, processing logic and/or software configured to operate the switching element 108, the power circuitry 120, and perform additional tasks, functions, and/or operations described in greater detail below. In an exemplary embodiment, the internal energy source 124 is realized as a rechargeable energy storage element configured to provide power to the power management system 112 when the switching element 108 is in an open state. In an exemplary embodiment, the internal energy source 124 is realized rechargeable battery with a small form-factor (e.g., a lithium-ion coin cell battery), however, in alternative embodiments, the internal energy source 124 may be realized as a capacitor (e.g., an ultracapacitor or supercapacitor), a solar cell, or another suitable energy source.

In an exemplary embodiment, the processing system 122 is realized as one or more microcontrollers configured to perform the tasks, functions, and/or operations described herein. In alternative embodiments, the processing system 122 may be realized with a general purpose processor, a controller, a microprocessor, a state machine, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. The processing system 122 may also be implemented as a combination of computing devices, e.g., a plurality of processing cores, or any other such configuration. In practice, processing system 122 includes processing logic configured to carry out the functions, techniques, and processing tasks associated with the operation of the electrical system 100, as described in greater detail below. Furthermore, the steps of a method or algorithm described in connection with the embodiments disclosed herein may be embodied directly in hardware, in firmware, in a software module executed by processing system 122, or in any practical combination thereof. In an exemplary embodiment, the processing system 122 and power circuitry 120 may be encapsulated or otherwise contained within a single integrated circuit package (or chip), however, in alternative embodiments, the processing system 122 and power circuitry 120 may be implemented as a plurality of integrated circuit packages (or chips), a plurality of discrete components, or a combination thereof.

In an exemplary embodiment, the device interface 114 is configured to be coupled to the electronic device 104 and/or target energy source 118 and includes a connection arrangement 126 and a sensing arrangement 128. The connection arrangement 126 is coupled to the power circuitry 120 and includes a plug 130 (or another suitable physical feature) that is adapted to interface, mate, or otherwise establish an electrical connection with a corresponding receptacle of the electronic device 104 and/or target energy source 118. In this regard, when the plug 130 is inserted to the electronic device 104, a path for current from the output 111 of the power conversion module 110 to the electronic device 104 and/or target energy source 118 is created via the connection arrangement 126 and power circuitry 120.

In an exemplary embodiment, the sensing arrangement 128 is integral with the connection arrangement 126. As described in greater detail below, the processing system 122 is configured to detect or otherwise identify a connection event based on an electrical characteristic or condition of the sensing arrangement 128 that is indicative of the connection arrangement 126 being coupled to the electronic device 104 and/or target energy source 118, and operate the switching element 108 to provide a path for current from the supply energy source 116 in response to the connection event. Additionally, the processing system 122 is configured to detect or otherwise identify a disconnection event based on a condition or characteristic of the connection arrangement 126 and/or sensing arrangement 128 that is indicative of the electronic device 104 and/or target energy source 118 no longer desiring and/or requiring current from the supply energy source 116, and open the switching element 108 to prevent the flow of current from the supply energy source 116 in response to the disconnection event.

Figure 2:
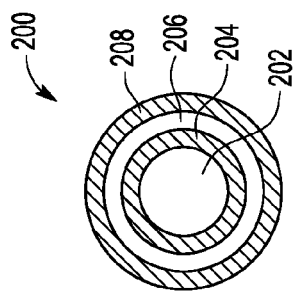
FIG. 2 is a cross-sectional view of a shielded cable suitable for use as a device interface with the electrical system of FIG. 1 in accordance with one embodiment of the invention.

Referring now to FIG. 2 depicts an exemplary embodiment of a shielded cable 200, such as, for example, a universal serial bus (USB) cable, a RS-232 serial cable, a D-subminiature (or D-sub) cable, a PS/2 cable, an HDMI cable, or another coaxial cable that is suitable for use as the device interface 114 in the electrical system 100 of FIG. 1. In an exemplary embodiment, the shielded cable 200 comprises an inner conductive core 202, an inner insulator 204, an outer conductor 206, and an outer insulator 208. As shown, in an exemplary embodiment, the inner insulator 204 is coaxial to and circumscribes the inner conductive core 202, the outer conductor 206 is coaxial to and circumscribes the inner insulator 204, and the outer insulator 208 is coaxial to and circumscribes the outer conductor 206. The inner conductive core 202 comprise one or more conductors (e.g., wires) for transmitting an electrical signal from one end of the shielded cable 200 (e.g., from the output of the power circuitry 120) to another end of the shielded cable 200 (e.g., to the electronic device 104 and/or target energy source 118). The inner insulator 204 comprises a dielectric material, such as plastic, rubber, fabric thread, or the like, that provides insulation and prevents conduction of electrical signals radially to/from the inner conductive core 202. The outer conductor 206 comprises a conductive material that provides electromagnetic shielding and mitigates the effect of radiated electromagnetic interference on signals propagating on the one or more wires of the inner conductive core 202. Thus, the outer conductor 206 is alternatively referred to as the shield, as will be appreciated in the art. In an exemplary embodiment, the shield 206 is realized as braided copper (or another suitable conductor) or copper fiber. The outer insulator 208 comprises a dielectric material, such as plastic, rubber, polyvinyl chloride (PVC), or the like, that provides insulation and prevents conduction of electrical signals radially to/from the shield 206.

Referring again to FIG. 1, with continued reference to FIG. 2, in accordance with one or more embodiments, when the power adapter 102 is realized as a plug-in or wall-mounted power adapter, the device interface 114 is realized as a shielded cable 200, wherein the connection arrangement 126 comprises the inner conductive core 202 of the shielded cable 200 and the sensing arrangement 128 comprises the shield 206 of the shielded cable 200. As described in greater detail below, in accordance with one embodiment, the plug 130 of the device interface 114 is configured to connect the sensing arrangement 128 and/or shield 206 to the electrical ground when the plug 130 is connected to the electronic device 104, wherein the processing system 122 is configured to monitor the voltage of the sensing arrangement 128 and/or shield 206 and detect a connection event based on the voltage of the sensing arrangement 128 and/or shield 206. In another embodiment, the processing system 122 is configured to utilize the sensing arrangement 128 and/or shield 206 as a capacitance sensing electrode and detect a connection event based on the capacitance of the sensing arrangement 128 and/or shield 206.

Figure 3:
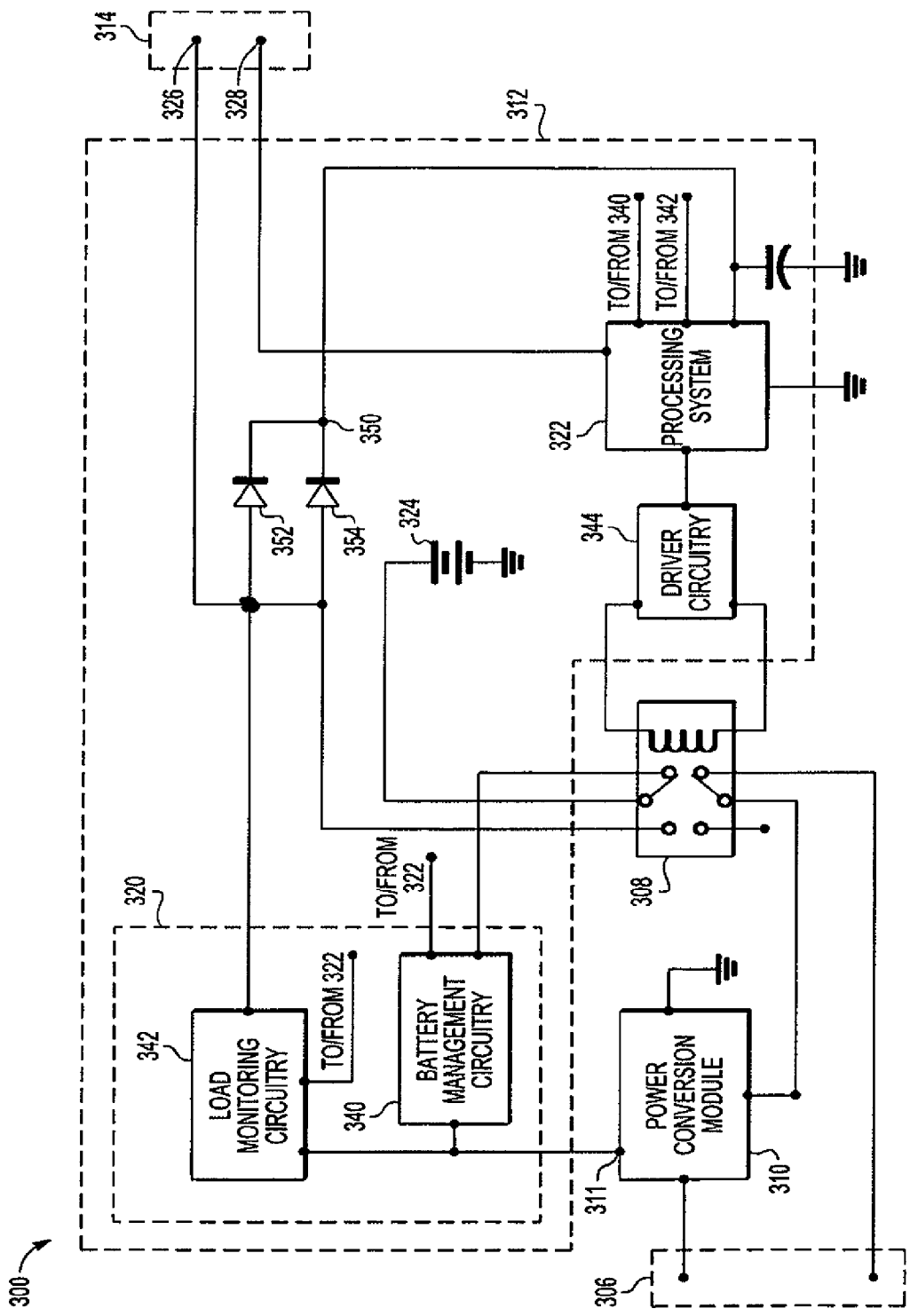
FIG. 3 is a schematic view of an electrical system suitable for use in a power adapter in accordance with one embodiment of the invention.

FIG. 3 depicts an exemplary electrical system 300 suitable for use with a power adapter for an electronic device in accordance with another embodiment. The electrical system 300 includes, without limitation, a supply interface 306, a switching element 308, a power conversion module 310, a power management system 312 and a device interface 314. The power management system 312 includes power circuitry 320, a processing system 322, and an internal energy source 324. Various elements of FIG. 3 are similar to counterpart elements described above in the context of FIG. 1, and such elements will not be redundantly described here in the context of FIG. 3. In an exemplary embodiment, a first node 326 of the device interface 314 is connected to and/or integral with a connection arrangement (e.g., connection arrangement 126) and a second node 328 of the device interface 314 is connected to and/or integral with a sensing arrangement (e.g., sensing arrangement 128). It should be understood that FIG. 3 is a simplified representation of an electrical system 300 for purposes of representation and ease of explanation and is not intended to limit the subject matter described herein in any way. It will be appreciated that practical embodiments of the electrical system 300 may include additional components and/or elements configured to perform additional functionality not described herein.

In an exemplary embodiment, the power circuitry 320 includes battery management circuitry 340 and load monitoring circuitry 342. The battery management circuitry 340 generally represents the hardware, firmware, processing logic and/or software (or combination thereof) configured to monitor the voltage and/or state of charge of the internal energy source 324 and charge the internal energy source 324 from the output 311 of the power conversion module 310. The battery management circuitry 340 is coupled to the output 311 of the power conversion module 310 and the internal energy source 324 via the switching element 308. In an exemplary embodiment, the battery management circuitry 340 is coupled to the processing system 322 and provides information regarding the voltage and/or state of charge of the internal energy source 324 to the processing system 322, as described in greater detail below. The load monitoring circuitry 342 generally represents the hardware, firmware, processing logic and/or software (or combination thereof) configured to monitor the current and/or voltage being provided from to the device interface 314. In an exemplary embodiment, the load monitoring circuitry 342 is coupled to the processing system 322 and provides the processing system 322 with information regarding the amount of current flowing to the device interface 314, as described in greater detail below. In an exemplary embodiment, the power management system 312 includes driver circuitry 344 coupled between the processing system 322 and the switching element 308. The driver circuitry 344 generally represents the hardware configured to change the state of the switching element 308 in response to a signal from the processing system 322.

As shown in FIG. 3, in an exemplary embodiment, the switching element 308 is realized as a double pole double throw (DPDT) latching relay. In this regard, in a first state (e.g., the closed state or ON state) for the DPDT latching relay 308, the DPDT latching relay 308 provides a path for current from the supply interface 306 to the power conversion module 310, and the DPDT latching relay 308 also provides a path for current from the battery management circuitry 340 to the internal energy source 324. While the DPDT latching relay 308 is in the first state, the power conversion module 310 converts power from the supply interface 306 to a voltage level at its output 311 in a similar manner as described above in the context of FIG. 1, wherein the battery management circuitry 340 monitors and/or charges the internal energy source 324 as needed from the output 311 of the power conversion module 310. As described in greater detail below, in response to a disconnection event, the processing system 322 generates or otherwise provides a signal that causes the driver circuitry 344 to change the state of the DPDT latching relay 308 (e.g., open or turn OFF). In the second state (e.g., the open state or OFF state) for the DPDT latching relay 308, the DPDT latching relay 308 prevents current flow from the supply interface 306 by removing the path for current from the supply interface 306 to the power conversion module 310. The DPDT latching relay 308 is configured such that while in the second state, the internal energy source 324 is coupled to the processing system 322 at node 350 via the DPDT latching relay 308. Thus, in the open state (or OFF state), the internal energy source 324 provides operating power to the processing system 322. In the illustrated embodiment, a first diode 352 is provided between node 326 and node 350 and configured to prevent current from flowing from node 350 to node 326 and a second diode 354 is provided between the DPDT latching relay 308 and node 350 to prevent current from flowing from node 350 to the internal energy source 324. In this regard, in an exemplary embodiment, the voltage of the internal energy source 324 (less the ON voltage of diode 354) is preferably less than the voltage at node 326 (less the ON voltage of diode 352) to ensure the internal energy source 324 only provides power to the processing system 322 when the DPDT latching relay 308 is in the second state. As described in greater detail below, when the DPDT latching relay 308 is in an open state, in response to a signal at node 328 that is indicative of the node 326 being electrically connected to a device and/or target energy source, the processing system 322 generates or otherwise provides a signal that causes the driver circuitry 344 to change the state of the DPDT latching relay 308 from the second state (or open state) to the first state (or closed state).

Figure 4:
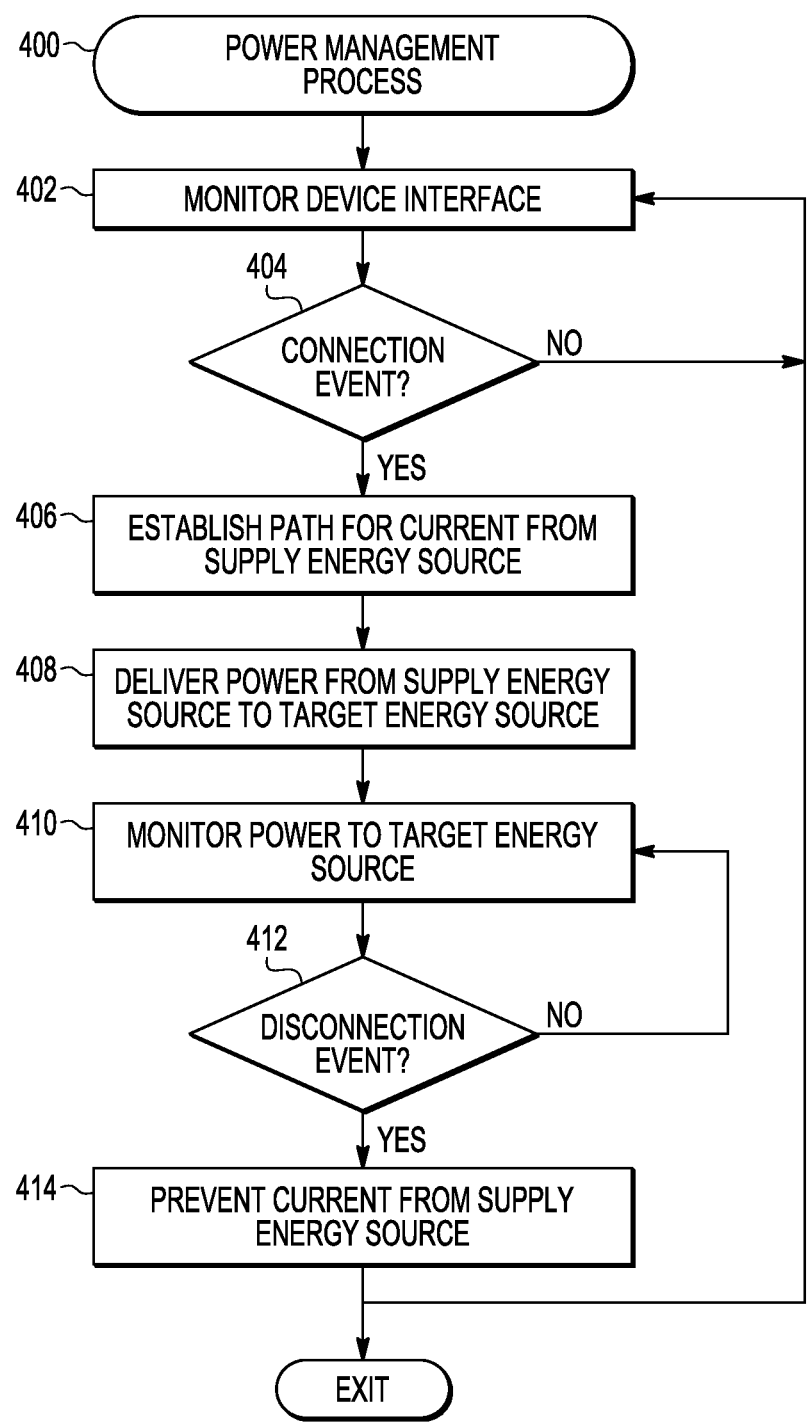
FIG. 4 is a flow diagram of a power management process suitable for use with the electrical system of FIG. 1 or FIG. 3 in accordance with one embodiment of the invention.

Referring now to FIG. 4, in an exemplary embodiment, an electrical system may be configured to perform a power management process 400 and additional tasks, functions, and/or operations as described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as the switching element 108, the power conversion module 110, 310 the power management system 112, 312 the power circuitry 120, 320 the processing system 122, 322 the connection arrangement 126 and/or the sensing arrangement 128. It should be appreciated any number of additional or alternative tasks may be included, and may be incorporated into a more comprehensive procedure or process having additional functionality not described in detail herein.

Referring now to FIG. 4, and with continued reference to FIGS. 1-3, a power management process 400 may be performed by an electrical system in a power adapter to efficiently utilize power from a supply energy source, such as the electric power grid or mains electricity, and avoid wasting or otherwise consuming unutilized power when the power adapter is coupled to (or plugged-in to) the supply energy source for an extended duration of time. In this regard, a user may couple or otherwise plug-in the AC interface 106 of the power adapter 102 to the AC energy source 116 and then leave the power adapter 102 coupled to the AC energy source 116 without being concerned about wasting electrical power. In an exemplary embodiment, the switching element 108 is configured to be initially in an open state (or OFF state), such that the power adapter 102 and/or electrical system 100 does not consume power from the AC energy source 116 by default. As described above, when the switching element 108 is in the open state, the switching element 108 prevents or otherwise inhibits the flow of current (or power) from the AC energy source 116 to the electrical system 100 and/or power conversion module 110. As a result, the transformer or other components of the power conversion module 110 do not consume and/or waste power from the AC energy source 116 when power from the AC energy source 116 is not desired and/or required. As described in greater detail below, the internal energy source 124 provides electrical power for the power management system 112 for performing various tasks, functions, and operations described herein when the switching element 108 is in an open state.

In an exemplary embodiment, the power management process 400 begins by monitoring the device interface of the power adapter, that is, the interface of the power adapter that is configured to be coupled to an electronic device, for a connection event (tasks 402, 404). In this regard, the connection event should be understood as referring to an electrical characteristic or condition of the device interface 114 and/or sensing arrangement 128 that is indicative of the device interface 114 being coupled to the electronic device 104 and/or the target energy source 118. In accordance with one embodiment, the device interface 114 is configured to ground the sensing arrangement 128 and/or shield 206 when the device interface 114 is plugged-in to or otherwise coupled to the electronic device 104 and/or target energy source 118, wherein the power management system 112 monitors the voltage of the sensing arrangement 128 and/or shield 206 and identifies the connection event when the voltage of the sensing arrangement 128 and/or shield 206 corresponds to ground. In accordance with one or more embodiments, the power management system 112 implements a pull-up resistor coupled between a supply voltage (e.g., from internal energy source 124) and the sensing arrangement 128 and/or shield 206, such that the voltage at the node between the pull-up resistor and the sensing arrangement 128 and/or shield 206 goes from a logical '1' (or logical high state) to a logical '0' (or logical low state) when the device interface 114 is coupled to the electronic device 104 and/or target energy source 118. In this regard, the processing system 122 may be realized as a microcontroller having an internal resistor coupled between the supply voltage for the processing system 122 and a pin that is connected to the sensing arrangement 128 and/or shield 206, wherein the processing system 122 monitors the voltage of the pin and identifies a connection event when the voltage of the pin corresponds to logical '0.' For example, referring to the embodiment of FIG. 3, in accordance with one embodiment, a resistive element having a resistance of about one megohm is connected between node 350 and node 328 (either internal to or external to processing system 322), wherein the processing system 322 monitors the voltage of node 328 and identifies a connection event when the voltage of node 328 corresponds to a logical '0.'

In accordance with another embodiment, the power management system 112 monitors the capacitance of the sensing arrangement 128 and/or shield 206 and identifies the connection event when the capacitance of the sensing arrangement 128 and/or shield 206 corresponds to the device interface 114 being coupled to the electronic device 104 and/or target energy source 118. In this regard, when the device interface 114 is realized as a shielded cable 200, the outer insulator 208 creates in a capacitance between the shield 206 and the outer surface of the shielded cable 200 (e.g., the exterior of the outer insulator 208). The capacitance between the shield 206 and the outer surface of the shielded cable 200 is influenced by contact with the outer surface of the shielded cable 200, such that the processing system 122 may identify a capacitance corresponding to a user grabbing the shielded cable 200 for purposes of plugging-in or otherwise coupling the shielded cable 200 to an electronic device 104. In accordance with one or more embodiments, the power management system 112 applies an input signal (e.g., a constant voltage and/or current) to the sensing arrangement 128 and/or shield 206, measures a response signal (e.g., the current and/or voltage resulting from the input signal), and determines the capacitance of the sensing arrangement 128 and/or shield 206 based on the relationship between the input signal and the response signal. For example, the processing system 122 may determine a time constant based on the rise time of the response signal relative to the input signal, and determine the capacitance of the sensing arrangement 128 and/or shield 206 based on the time constant. In this regard, in accordance with one or more embodiments, the processing system 122 is realized as a microcontroller having a pin that is connected to the sensing arrangement 128 and/or shield 206, wherein the processing system 122 applies a constant current to the pin, monitors and/or measures the voltage of the pin in response to the constant current, and determines the capacitance of the sensing arrangement 128 and/or shield 206 based on the relationship between the input current and the response voltage. For example, referring to the embodiment of FIG. 3, the processing system 322 may apply a constant current to node 328 that is connected to a sensing arrangement 128 and/or shield 206, monitor and/or measure the voltage of node 328, and determine the capacitance at node 328 based on the relationship between the input current and the response voltage.

In an exemplary embodiment, in response to identifying a connection event, the power management process 400 continues by establishing a path for current (or power) flow from the supply energy source (task 406). In an exemplary embodiment, the power management system 112 establishes a path for current from the AC energy source 116 by automatically operating switching element 108 provide a path for current from the AC energy source 116 to the electrical system 100 and/or power conversion module 110 in response to identifying a connection event. In an exemplary embodiment, the processing system 122 monitors the voltage of the sensing arrangement 128 and when the voltage of the sensing arrangement 128 corresponds to logical '0' (e.g., in response to the plug 130 being inserted into a corresponding receptacle on the electronic device 104), the processing system 122 automatically signals the switching element 108 to close, turn OFF, or otherwise change to a closed state. For example, referring to the embodiment of FIG. 3, when the voltage of node 328 corresponds to a connection event, the processing system 322 may signal the driver circuitry 344 to change the state of the DPDT latching relay 308 to a closed state that provides a path for current from the supply interface 306 to the power conversion module 310.

In an alternative embodiment, as described above, the processing system 122 may monitor the capacitance of the sensing arrangement 128 and automatically signal the switching element 108 to change to a closed state when the capacitance of the sensing arrangement 128 is indicative of the device interface 114 being coupled to the electronic device 104. In this regard, when the device interface 114 is not coupled to the electronic device 104, the sensing arrangement 128 and/or shield 206 has a floating voltage, resulting in a relatively short rise time for the voltage in response to a constant current applied to the sensing arrangement 128 and/or shield 206, and thus, the processing system 122 may determine the capacitance of the sensing arrangement 128 and/or shield 206 is relatively low. When the device interface 114 (e.g., shielded cable 200) is grasped by a user, the capacitance of the sensing arrangement 128 and/or shield 206 increases, resulting in a corresponding increase to the rise time for the voltage of the sensing arrangement 128 and/or shield 206 in response to the constant current. Furthermore, when the device interface 114 is coupled to the electronic device 104 and the sensing arrangement 128 and/or shield 206 is grounded, the rise time for the voltage of the sensing arrangement 128 and/or shield 206 increases exponentially by virtue of the fact that the voltage of the sensing arrangement 128 and/or shield 206 is prevented from rising. Thus, the processing system 122 may identify or otherwise detect a connection event when the capacitance of the sensing arrangement 128 and/or shield 206 is greater than a threshold capacitance and automatically signal the switching element 108 to change to a closed state when the capacitance of the shield 206 is greater than the threshold capacitance. The threshold capacitance is preferably chosen to be indicative of a user firmly grasping the device interface 114, such that the switching element 108 is closed in response to either a user firmly grasping the device interface 114 or the device interface 114 being plugged-in to or otherwise coupled to the electronic device 104 and/or target energy source 118.

In accordance with another embodiment, the sensing arrangement 128 may be realized as an accelerometer, wherein the processing system 122 monitors the voltage of the sensing arrangement 128 and identifies the connection event when the voltage of the sensing arrangement 128 corresponds to an acceleration indicative of a user coupling the device interface 114 to the electronic device 104 and/or the target energy source 118. In this regard, the sensing arrangement 128 may produce and/or generate a voltage that is roughly proportional to a rate of acceleration and/or movement of the device interface 114, such that the processing system 122 may identify or otherwise detect a connection event when the voltage of the sensing arrangement 128 (or a change thereof) is greater than a threshold voltage. The threshold voltage is chosen to be great enough that a voltage exceeding the threshold voltage has a sufficiently high likelihood of being attributable to a user coupling the device interface 114 to the electronic device 104 and/or the target energy source 118, such that the switching element 108 is not closed in response to inadvertent contact with the device interface 114.

In an exemplary embodiment, after establishing a path for electrical current (or power) flow from the supply energy source, the power management process 400 continues by delivering power to the target energy source and/or the electronic device from the supply energy source (task 408). Depending on the embodiment, the power management process 400 may be performed to supply operating power to the electronic device 104 from the supply energy source 116 or to provide charging (or recharging) current to the target energy source 118 within the electronic device 104. As described above, the power conversion module 110 converts the voltage and/or current from the AC energy source 116 to a voltage and/or current level suitable for the target energy source 118. For example, in an exemplary embodiment, the AC energy source 116 comprises 120 Volts AC mains electricity at 60 Hz and the target energy source 118 comprises a 5 Volt DC rechargeable battery, wherein the power conversion module 110 converts the 120 Volts AC at its input 109 to approximately 5 Volts DC at its output 111. The processing system 122 operates the power circuitry 120 to deliver power to the electronic device 104 and/or the target energy source 118 via the device interface 114 (e.g., connection arrangement 126 or inner conductive core 202).

In an exemplary embodiment, the power management process 400 detects or otherwise identifies a disconnection event by monitoring the device interface of the power adapter for a disconnection event (tasks 410, 412). As used herein, a disconnection event should be understood as referring to a condition or characteristic of the device interface that indicates the electronic device and/or target energy source no longer desires and/or requires power from the AC energy source, for example, when the device interface 114 is disconnected or unplugged from the electronic device 104 or the target energy source 118 is adequately charged (e.g., charged above a threshold state of charge). In accordance with one embodiment, the processing system 122 monitors the voltage of the sensing arrangement 128 and/or shield 206 and identifies or otherwise detects a disconnection event when the shield 206 is ungrounded (or floating), indicating that the device interface 114 is decoupled or disconnected from the electronic device 104 and/or target energy source 118. As described above, the processing system 122 may implement a pull-up resistor which causes the voltage of the node between the pull-up resistor and the sensing arrangement 128 and/or shield 206, that is, the voltage of the pin coupled to the sensing arrangement 128 and/or shield 206, to change from a logical '0' (or logical low state) to a logical '1' (or logical high state) when the device interface 114 is disconnected and/or decoupled from the electronic device 104 and the sensing arrangement 128 and/or shield 206 is ungrounded.

In accordance with another embodiment, the power management system 112 may be coupled to the connection arrangement 126 and configured to identify a disconnection event based on a current through the connection arrangement 126. For example, the processing system 122 may be coupled to the connection arrangement 126 to monitor the current through the connection arrangement 126, wherein the processing system 122 identifies or otherwise detects a disconnection event when the current through the connection arrangement 126 is less than a threshold value. Alternatively, for the embodiment illustrated in FIG. 3, the load monitoring circuitry 342 may periodically monitor the current flowing to node 326 and provide the result to the processing system 322. The current flowing to the target energy source 118 may decrease as the target energy source 118 nears a full state of charge, wherein the threshold value is chosen to indicate the target energy source 118 no longer requires power from the supply energy source 116, for example, when the target energy source 118 has a state of charge greater than or equal to a threshold amount (e.g., 100% state of charge). It will be appreciated that the threshold value may vary depending on the particular charging scheme (e.g., trickle charging, constant current charging, constant voltage charging, and the like) being utilized by the electronic device 104. In accordance with another embodiment, the threshold value may be chosen to be a current value indicative of the device interface 114 and/or plug 130 no longer being coupled to the electronic device 104, for example, zero amperes.

In some embodiments, the processing system 122 may implement a timer corresponding to the nominal amount of time required to fully charge the target energy source 118 and identify a disconnection event when the timer expires, thereby ensuring that the electrical system 100 and/or power adapter 102 does not perpetually consume current (or power) from the supply energy source 116, as will be appreciated in the art. In accordance with one embodiment, the processing system 122 may identify or detect a disconnection event when the capacitance of the sensing arrangement 128 and/or shield 206 decreases below a threshold value in a similar manner as described above. In accordance with yet another embodiment, when the sensing arrangement 128 is realized as an accelerometer, the processing system 122 may identify or detect a disconnection event when the voltage of the sensing arrangement 128 (or a change thereof) corresponds to a user decoupling the device interface 114 from the electronic device 104 and/or target energy source 118.

In an exemplary embodiment, in response to detecting or otherwise identifying a disconnection event, the power management process 400 continues by preventing current (or power) flow from the supply energy source (task 414). In this regard, in response to a disconnection event, such as, for example, a user disconnecting the plug 130 and/or device interface 114 from the electronic device 104, the processing system 122 opens, turns OFF, or otherwise changes the state of the switching element 108 to an open state to remove the path for current from the AC energy source 116 to the electrical system 100 such that there is no path for current from the AC energy source 116. For example, referring to the embodiment of FIG. 3, when a resistive element is connected between node 350 and node 328, the processing system 322 may identify a disconnection event when the voltage of node 328 corresponds to a logical '1,' and in response to the disconnection event, provide a signal to the driver circuitry 344 to change the state of the DPDT latching relay 308 to the open state. In this manner, the components of the electrical system 100, such as the power conversion module 110, the power management system 112, the target energy source 118 and/or the electronic device 104, are effectively electrically disconnected from the AC energy source 116 even though the power adapter 102 and/or plug 106 remains coupled to and/or plugged-in to the AC energy source 116. The loop defined by tasks 402, 404, 406, 408, 410, 412 and 414 may repeat as necessary throughout the duration of time the power adapter 102 is plugged-in and/or coupled to the AC energy source 116.

As described above, in an exemplary embodiment, the internal energy source 124 provides power to the processing system 122 for monitoring the device interface 114 for a connection event while the switching element 108 is in an open state. In this regard, in practice, the amount of current (or power) needed by the processing system 122 to monitor the device interface 114 is relatively small (e.g., on the order of microamperes), such that the internal energy source 124 is capable of providing adequate power over a sufficient duration of time. In an exemplary embodiment, when the switching element 108 is closed, the processing system 122 operates the power circuitry 120 in a manner that provides charging current (or power) to the internal energy source 124, such that the internal energy source 124 maintains or otherwise achieves an adequate state of charge before the switching element 108 is subsequently opened. In alternative embodiments, the internal energy source 124 may be allowed to be fully depleted, at which point, a user may replace the internal energy source 124, for example, by removing a depleted coin cell battery and inserting an unused and/or fully charged coin cell battery.

In an exemplary embodiment, the processing system 122 is configured to monitor the state of charge of the internal energy source 124, and when the state of charge of the internal energy source 124 is less than or equal to a lower state of charge threshold, the processing system 122 is configured to close the switching element 108 and operate the power circuitry 120 to charge the internal energy source to an upper state of charge threshold. When the state of charge of the internal energy source 124 is greater than or equal to the upper state of charge threshold, the processing system 122 is configured to reopen the switching element 108 to prevent additional current flow (or power flow) from the supply energy source 106. In this manner, the processing system 122 maintains the state of charge of the internal energy source 124 within a desired range suitable for long-term operation of the power management system 112. For example, referring to the embodiment of FIG. 3, when the state of charge of the internal energy source 324 is less than or equal to a lower state of charge threshold, the processing system 322 signals the driver circuitry 344 to close or otherwise change the state of the DPDT latching relay 308 to the state which provides a path for current from the supply interface 306. The battery management circuitry 340 charges the internal energy source 324 from the output 311 of the power conversion module 310 until the state of charge of the internal energy source 324 is greater than or equal to an upper state of charge threshold. When the state of charge of the internal energy source 324 is greater than or equal to an upper state of charge threshold, the processing system 322 signals the driver circuitry 344 to open or otherwise change the state of the DPDT latching relay 308 to the state which prevents current from the supply interface 306 while providing current from the internal energy source 324 to the processing system 322 to allow the internal energy source 324 to provide operating power to the processing system 322.

By virtue of the power management process 400 described herein, the standby power consumed by the power adapter 102 and/or electrical system 100 is reduced. For example, a user may insert the AC power plug 106 of the power adapter 102 into a wall socket for AC energy source 116 and insert the device plug 130 into the electronic device 104. In response to the plug 130 being inserted into the electronic device 104 (i.e., a connection event), the power management system 112 and/or processing system 122 closes the switching element 108 and delivers power from the AC energy source 116 to the electronic device 104. In a charging application, the power management system 112 and/or processing system 122 may identify when the target energy source 118 is at or near fully charged based on a decrease in the flow of current to the target energy source 118, and open the switching element 108 to prevent the power adapter 102 and/or electronic device 104 from consuming any additional current (or power) from the AC energy source 116. When the device interface 114 and/or plug 130 is disconnected from the electronic device 104, the switching element 108 remains open, preventing the electrical system 100 from consuming any current (or power) from the AC energy source 116 until either the device interface 114 and/or plug 130 is coupled to the electronic device 104 or the internal energy source 124 reaches a lower state of charge limit. The power management system 112 and/or processing system 122 is configured to automatically open switching element 108 in response to a disconnection event and automatically close the switching element 108 in response to a connection event without any intervention or effort required on behalf of a user.

Systems and methods configured in accordance with example embodiments of the invention relate to:

In accordance with one embodiment, an electrical system for delivering power from a first energy source to a second energy source is provided. The electrical system comprises an interface configured to be coupled to the second energy source, a switching element coupled between the first energy source and the interface, and a processing system coupled to the switching element and the interface. The processing system is configured to identify a connection event based on an electrical characteristic of the interface that is indicative of the interface being coupled to the second energy source, and in response to identifying the connection event, operate the switching element to provide a path for current from the first energy source. In accordance with one embodiment, the interface comprises a shielded cable including a shield, wherein the processing system is configured to identify the connection event based on a voltage of the shield. In another embodiment, the processing system is configured to identify the connection event based on a capacitance of the shield. In accordance with another embodiment, the processing system is configured to identify a disconnection event indicative of the interface being decoupled from the second energy source and operate the switching element to remove the path for current from the first energy source in response to the disconnection event. In yet another embodiment, the electrical system further comprises a power conversion module coupled between the switching element and the interface. The power conversion module is configured to deliver power from the first energy source to the second energy source via the interface when the switching element provides the path for current from the first energy source. In a further embodiment, the processing system is configured to identify a disconnection event indicative of the second energy source no longer requiring power from the first energy source, and in response to identifying the disconnection event, operate the switching element to prevent current from the first energy source to the power conversion module. In a further embodiment, the electrical system further comprises a third energy source and battery management circuitry. The third energy source is coupled to the processing system when the switching element prevents current from the first energy source. The battery management circuitry is coupled between an output of the power conversion module and the third energy source. The processing system is configured to operate the switching element provide a path for current from the first energy source when a state of charge of the third energy source is less than or equal to a first threshold, wherein the battery management circuitry is configured to charge the third energy source from the output of the power conversion module. The processing system is further configured to operate the switching element to prevent current from the first energy source to the power conversion module when the state of charge of the third energy source is greater than or equal to a second threshold.

In accordance with another embodiment, a system for delivering power from a first energy source to a device is provided. The system comprises a first interface configured to be coupled to the first energy source and a second interface configured to be coupled to the device. A switching element is coupled between the first interface and the second interface, and the switching element is configured to control flow of current from the first interface. A power management system is coupled to the second interface and the switching element. The power management system is configured to close the switching element in response to the second interface being coupled to the device, wherein closing the switching element results in a path for current from the first interface. In accordance with one embodiment, the system further comprises a power conversion module coupled between the switching element and the second interface. The power conversion module is configured to deliver power from the first energy source to the device via the second interface when the switching element is closed. In response to the second interface being decoupled from the device, the power management system is configured to open the switching element to inhibit current flow from the first energy source. In accordance with another embodiment, the device includes a second energy source and the second interface comprises a connection arrangement and a sensing arrangement integral with the connection arrangement. The sensing arrangement is coupled to the power management system, wherein the power management system is configured to detect a first condition of the sensing arrangement, the first condition being indicative of the second interface being coupled to the device, and close the switching element in response to the first condition, wherein the connection arrangement is configured to be coupled between the switching element and the second energy source when the second interface is coupled to the device and the switching element is closed. In a further embodiment, the power management system is configured to detect a second condition of the second interface that is indicative of the second interface being decoupled from the device, and open the switching element in response to the second condition such that the switching element prevents flow of current from the first energy source. In accordance with another embodiment, the device includes a second energy source and the second interface comprises an inner conductive core, an insulator coaxial to and circumscribing the inner conductive core, and a conductor coaxial to and circumscribing the insulator. The power management system is coupled to the conductor and configured to detect a characteristic of the conductor that is indicative of the second interface being coupled to the device, and close the switching element in response to detecting the characteristic of the conductor that is indicative of the second interface being coupled to the device, wherein the inner conductive core is coupled between the switching element and the second energy source when the second interface is coupled to the device. In a further embodiment, the power management system is configured to detect a voltage of the conductor that is indicative of the second interface being coupled to the device and close the switching element in response to the voltage of the conductor that is indicative of the second interface being coupled to the device. In another embodiment, the power management system is configured to apply an input electrical signal to the conductor, resulting in a response signal on the conductor, determine a capacitance of the conductor based on the response signal, and close the switching element in response to the capacitance of the conductor being indicative of the second interface being coupled to the device.

In another embodiment, a method for delivering power to a target energy source from a supply energy source using an interface configured to be coupled to the target energy source is provided. The interface comprises a connection arrangement and a sensing arrangement integral with the connection arrangement. The method comprises detecting a connection event based on an electrical characteristic of the sensing arrangement, the connection event being indicative of the interface being coupled to the target energy source, and establishing a path for current from the supply energy source in response to the connection event. The supply energy source delivers power to the target energy source via the connection arrangement when the path for current from the supply energy source is established. In a further embodiment, the connection arrangement comprises a first conductor and the sensing arrangement comprises a second conductor coaxial to the first conductor, wherein detecting the connection event comprises detecting a capacitance of the second conductor that is indicative of the interface being coupled to the target energy source. In another embodiment, detecting the connection event comprises detecting a voltage of the second conductor that is indicative of the interface being coupled to the target energy source. In yet another embodiment, a switching element is coupled between the supply energy source and the interface. The switching element is configured to prevent current from the supply energy source in an open state, wherein establishing the path for current comprises closing the switching element in response to the connection event. The switching element provides the path for current from the supply energy source in a closed state. In another embodiment, the method further comprises detecting a disconnection event based on an electrical characteristic of the interface, the disconnection event being indicative of the target energy source no longer requiring delivery of power from the supply energy source, and opening the switching element in response to the disconnection event. In accordance with another embodiment, the method further comprises detecting a disconnection event based on an electrical characteristic of the interface, the disconnection event being indicative of the target energy source no longer requiring delivery of power from the supply energy source, and preventing current from the supply energy source in response to the disconnection event.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for delivering power from a first energy source to a second energy source, the electrical system comprising:
    a first interface configured to be coupled to the first energy source;
    a second interface configured to be coupled to the second energy source;
    a switching element coupled between the first interface and the second interface; and
    a processing system coupled to the switching element and the second interface, wherein the processing system is configured to:
        identify a connection event based on an electrical characteristic of the second interface that is indicative of the second interface being coupled to the second energy source; and
        in response to identifying the connection event, operate the switching element to provide a path for current from the first energy source;
    a third energy source;
    a switch, the third energy source being coupled to power the processing system via the switch in a closed switch state when the switching element is operated to remove the path for current from the first energy source, wherein the switch is in an open switch state when the switching element is operated to provide the path for current from the first energy source.

2. The electrical system of claim 1 wherein the switching element includes a first pole switch and a second pole switch, the first pole switch coupled between the first interface and the second interface, wherein the switch is implemented with the second pole switch, wherein processing system is configured to in response to identifying the connection event, operate the first pole switch to provide the path for current from the first energy source.

3. The electrical system of claim 2 wherein:
    the second pole switch is a double throw switch having a first terminal coupled to the third power source, a second terminal coupled to the processing system, and a third terminal coupled to circuitry that receives power via the first pole switch from the first energy source for charging the third energy source when the first switching element is operated to provide the path for current from the first energy source in a first switch state;
    wherein in the first switch state of the switching element, the third terminal is connected to the first terminal;
    wherein in a second switch state of the switching element, the second terminal is connected to the first terminal and the first pole switch is operated not to provide the path for current from the first energy source;
    wherein the first switch state of the switching element corresponds to the open switch state of the switch and the second switch state of the switching element corresponds to the close switch state of the switch.

4. The electrical system of claim 2 wherein the third energy source is a battery.

5. The electrical system of claim 1 wherein the third energy source is a battery.

6. The electrical system of claim 1 wherein:
    the switch is a double throw switch having a first terminal coupled to the third energy source, a second terminal coupled to the processing system, and a third terminal coupled to circuitry that receives power via the switching element from the first energy source for charging the third energy source when the first switching element is operated to provide the path for current from the first energy source in a first switch state;
wherein in the first switch state of the switching element, the third terminal is connected to the first terminal, wherein the third terminal being connected to the first terminal corresponds to the open switch state of the switch;
wherein in a second switch state of the switching element, the second terminal is connected to the first terminal and the switching element is operated not to provide the path for current from the first energy source, wherein the second terminal being connected to the first terminal corresponds to the closed switch state of the switch.

7. The electrical system of claim 6 wherein the third energy source is a battery.

8. The electrical system of claim 6 wherein the processing system is powered from the first energy source when the first energy source is providing current via the path.

9. The electrical system of claim 1 wherein the processing system is powered from the first energy source when the first energy source is providing current via the path.

10. The electrical system of claim 9 wherein the third energy source is a battery.

11. An electrical system for delivering power from a first energy source to a second energy source, the electrical system comprising:
    a first interface configured to be coupled to the first energy source;
    a second interface configured to be coupled to the second energy source;
    a switching element coupled between the first interface and the second interface; and
    a processing system coupled to the switching element and the second interface, wherein the processing system is configured to operate the switching element to provide a path for current from the first energy source for charging the second energy source and operate the switching element to remove the path for current from the first energy source;
    a third energy source;
    a switch, the third energy source being coupled to power the processing system via the switch in a closed switch state when the switching element is operated to remove the path for current from the first energy source, wherein the switch is in an open switch state when the switching element is operated to provide the path for current from the first energy source.

12. The electrical system of claim 11 wherein the switching element includes a first pole switch and a second pole switch, the first pole switch coupled between the first interface and the second interface, wherein the switch is implemented with the second pole switch, wherein processing system is configured to in response to identifying the connection event, operate the first pole switch to provide the path for current from the first energy source.

13. The electrical system of claim 12 wherein:
    the second pole switch is a double throw switch having a first terminal coupled to the third energy source, a second terminal coupled to the processing system, and a third terminal coupled to circuitry that receives power via the first pole switch from the first energy source for charging the third energy source when the first switching element is operated to provide the path for current from the first energy source in a first switch state;
    wherein in the first switch state of the switching element, the third terminal is connected to the first terminal;
    wherein in a second switch state of the switching element, the second terminal is connected to the first terminal and the first pole switch is operated not to provide the path for current from the first energy source;
    wherein the first switch state of the switching element corresponds to the open switch state of the switch and the second switch state of the switching element corresponds to the close switch state of the switch.

14. The electrical system of claim 11 wherein the processing system is powered from the first energy source when the first energy source is providing current via the path.

15. The electrical system of claim 11 wherein the third energy source is a battery.

16. The electrical system of claim 11 wherein:
    the switch is a double throw switch having a first terminal coupled to the third energy source, a second terminal coupled to the processing system, and a third terminal coupled to circuitry that receives power via the switching element from the first energy source for charging the third energy source when the first switching element is operated to provide the path for current from the first energy source in a first switch state;
    wherein in the first switch state of the switching element, the third terminal is connected to the first terminal, wherein the third terminal being connected to the first terminal corresponds to the open switch state of the switch;
    wherein in a second switch state of the switching element, the second terminal is connected to the first terminal and the switching element is operated not to provide the path for current from the first energy source, wherein the second terminal being connected to the first terminal corresponds to the closed switch state of the switch.

17. The electrical system of claim 16 wherein the third energy source is a battery.

18. The electrical system of claim 16 wherein the processing system is powered from the first energy source when the first energy source is providing current via the path.

19. An electrical system for delivering power from a first energy source to a second energy source, the electrical system comprising:
    a first interface configured to be coupled to the first energy source;
    a second interface configured to be coupled to the second energy source;
    a switching element coupled between the first interface and the second interface; and
    a processing system coupled to the switching element and the second interface, wherein the processing system is configured to:
        identify a connection event based on an electrical characteristic of the second interface that is indicative of the second interface being coupled to the second energy source; and
        in response to identifying the connection event, operate the switching element to provide a path for current from the first energy source;
    a battery, the battery being coupled to power the processing system when the switching element is operated to remove the path for current from the first energy source, wherein the battery does not provide power to the processing system when the switching element is operated to provide the path for current from the first energy source.

20. The electrical system of claim 19 wherein the processing system is powered from the first energy source when the first energy source is providing current via the path.

* * * * *